United States Patent
Han et al.

(10) Patent No.: US 9,680,921 B2
(45) Date of Patent: Jun. 13, 2017

(54) METHOD, APPARATUS, AND SYSTEM FOR CONTROLLING VOICE DATA TRANSMISSION

(71) Applicant: Tencent Technology (Shenzhen) Company Limited, Shenzhen (CN)

(72) Inventors: Bing Han, Shenzhen (CN); Huihao Xing, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 311 days.

(21) Appl. No.: 14/691,338

(22) Filed: Apr. 20, 2015

(65) Prior Publication Data

US 2015/0229708 A1 Aug. 13, 2015

Related U.S. Application Data

(63) Continuation of application No. PCT/CN2014/077991, filed on May 21, 2014.

(30) Foreign Application Priority Data

Jun. 3, 2013 (CN) .......................... 2013 1 0216307

(51) Int. Cl.
*G06F 15/173* (2006.01)
*H04L 29/08* (2006.01)
(Continued)

(52) U.S. Cl.
CPC ................ *H04L 67/10* (2013.01); *G06F 3/16* (2013.01); *G06Q 50/01* (2013.01);
(Continued)

(58) Field of Classification Search
CPC ... H04L 67/10; H04L 65/403; H04L 12/1827; H04L 51/04; H04L 51/32; H04L 51/12;
(Continued)

(56) References Cited

U.S. PATENT DOCUMENTS

2004/0255032 A1* 12/2004 Danieli ................... A63F 13/12
709/229
2005/0262542 A1* 11/2005 DeWeese ............ H04L 12/1818
725/106
(Continued)

FOREIGN PATENT DOCUMENTS

CN 102348168 A 2/2012
CN 102724355 A 10/2012
(Continued)

OTHER PUBLICATIONS

International Search Report and Written Opinion dated Sep. 5, 2014 for International Application No. PCT/CN2014/077991, 9 pages.

*Primary Examiner* — Chris Parry
*Assistant Examiner* — Weiwei Stiltner
(74) *Attorney, Agent, or Firm* — Brinks Gilson & Lione

(57) ABSTRACT

A method, apparatus, and system are provided for controlling data transmission in the field of voice communication. In the method: a server device receives a blocking request sent by a first terminal corresponding to a first user in a user group, where the blocking request carries an ID of a second user in the user group. The server device receives the voice data sent by a second terminal corresponding to the second user who is identified by the ID in the blocking request, and transmitting the voice data to terminals corresponding to other users in the user group apart from the first user and the second user. The voice data sent by any terminal corresponding to the second user is transmitted to the terminals corresponding to other users apart from the first user and the second user after receiving the blocking request carrying the ID of the second user.

14 Claims, 10 Drawing Sheets

(51) Int. Cl.
*H04L 12/58* (2006.01)
*H04L 12/18* (2006.01)
*H04L 29/12* (2006.01)
*H04L 29/06* (2006.01)
*G06Q 50/00* (2012.01)
*G06F 3/16* (2006.01)

(52) U.S. Cl.
CPC ...... *H04L 12/1813* (2013.01); *H04L 12/1818* (2013.01); *H04L 12/1822* (2013.01); *H04L 12/1827* (2013.01); *H04L 51/04* (2013.01); *H04L 51/32* (2013.01); *H04L 61/2069* (2013.01); *H04L 65/1016* (2013.01); *H04L 65/403* (2013.01)

(58) Field of Classification Search
CPC ............ H04L 65/1016; H04L 12/1813; H04L 12/1818; H04L 12/1822; H04L 61/2069; G06F 3/16; G06Q 50/01
USPC ........................................................ 709/225
See application file for complete search history.

(56) References Cited

U.S. PATENT DOCUMENTS

| 2009/0279532 A1* | 11/2009 | Perna ................... H04M 3/22 370/352 |
| 2012/0237053 A1* | 9/2012 | Alam ................... H04L 12/00 381/80 |
| 2013/0080928 A1* | 3/2013 | Zhuang ............... H04L 12/1822 715/758 |

FOREIGN PATENT DOCUMENTS

| CN | 102917105 A | 2/2013 |
| CN | 103338145 A | 10/2013 |

* cited by examiner

METHOD, APPARATUS, AND SYSTEM FOR CONTROLLING VOICE DATA TRANSMISSION

CROSS-REFERENCE TO RELATED APPLICATIONS

This application is a continuation of International Application No. PCT/CN2014/076331, filed on Apr. 28, 2014, which claims priority to Chinese Patent Application No. 201310216307.0, filed on Jun. 3, 2013, both of which are hereby incorporated by reference in their entireties.

FIELD

This disclosure relates to voice communication, especially relates to a method, apparatus and system for controlling the voice data transmission.

BACKGROUND

With the development of Internet technology, a variety of voice tools are provided to users by Internet product providers, users can make voice chat with other users via voice tools. Currently, many voice tools may support the function of multi-user voice chat which is achieved by transmitting the voice data sent by each user via the terminal to other users, so as to facilitate the communication between multiple users under a number of particular scenes. For example, the voice data sent by any teammate in a team via the terminal can be transmitted to other teammates during online team games, thus contributing to the effective communication between teammates in the team during the game. However, some users often send malicious voice during multi-user voice chat on the network, thus causing a more severe chat environment. Therefore, it needs to control the voice data transmission during multi-user voice chat, so as to optimize the chat environment in voice tools.

In the existing technology for controlling the voice data transmission, the apparatus for controlling the voice data transmission receives the report information sent by the terminal corresponding to the first user among multiple users, the report information includes the ID (Identifier) of the second user among multiple users and the evidence information for sending malicious voice by the second user; after the artificial identification determines that the second user matches the condition for sending malicious voice based on the evidence information in the report information, the apparatus for controlling the voice data transmission begin to control the transmission of voice data sent by the terminal corresponding to the second user according to the ID of the second user in the report information, e.g. transmitting the voice sent by the terminal corresponding to the second user to the terminals corresponding to other users among multiple users apart from the first user and the second user within the preset scope.

During the implementation of the present disclosure, the inventor found following issues in the existing technologies:

Upon receiving the report information from the first user, you also need to wait for the artificial identification, and after the identification determines that the second user matches the condition for sending malicious voice, the transmission of voice data sent by the terminal corresponding to the second user will be controlled, thus causing low effect for controlling the voice data transmission; and the voice sent by the terminal corresponding to the second user may also cause more interferences on the first user during waiting time, therefore the voice chat environment cannot be effectively optimized.

SUMMARY

The embodiments of the present disclosure provide a method, apparatus and system for controlling the voice data transmission.

In a first aspect, a method for controlling the voice data transmission is provided. In the method, a server device receives a blocking request sent by a first terminal corresponding to a first user in a user group, where the blocking request carries an identification (ID) of a second user in the user group. The server device receives the voice data sent by a second terminal corresponding to the second user who is identified by the ID in the blocking request, and transmitting the voice data to terminals corresponding to other users in the user group apart from the first user and the second user.

In a second aspect, an apparatus for controlling the voice data transmission is provided. The apparatus includes a hardware processor and a non-transitory storage medium accessible to the hardware processor. The non-transitory storage medium is configured to store at least the following modules implemented by the hardware processor: a first receiving module, a second receiving module, and a transmitting module. The first receiving module is configured to receive the blocking request sent by a first terminal corresponding to the first user among multiple users, where the blocking request carries the identification ID of the second user among multiple users. The Second Receiving module is configured to receive the voice data sent by a second terminal corresponding to the second user who is identified by the ID in the blocking request received by the First Receiving module. The transmitting module is configured to transmit the voice data received by the Second Receiving module to terminals corresponding to other users among multiple users apart from the first user and the second user.

In a third aspect, a method for controlling the voice data transmission is provided. In the method, a first terminal device having a processor determines an ID of a second user who is chosen to be blocked by a user in a user group. The first terminal device uploads the blocking request carried in the ID of the second user to an apparatus so that the apparatus controls the voice data transmission on the terminal corresponding to the second user based on the ID of the second user.

In a fourth aspect, an apparatus for controlling the voice data transmission is provided. The apparatus includes a hardware processor and a non-transitory storage medium accessible to the hardware processor. The non-transitory storage medium is configured to store at least the following modules implemented by the hardware processor: a determining module and an uploading module. The determining module for determining the identification ID of the second user who is chosen to be blocked by users. The uploading module for uploading the blocking request carried in the ID of the second user and determined by the Determining module, to make the apparatus, which receives the blocking request, to control the voice data transmission on the terminal corresponding to the second user based on the ID of the second user.

In a fifth aspect, a system for controlling the voice data transmission is provided. The system includes a server and multiple terminals. The server is configured with the apparatus for controlling the voice data transmission as mentioned in the second aspect; the terminal is configured with the apparatus for controlling the voice data transmission as mentioned in the fourth aspect.

BRIEF DESCRIPTION OF THE DRAWINGS

The drawings need to be used in the description of the embodiment is described in brief as follow, so as to make the technical scheme in the embodiments of the present disclosure much clear. It is obvious that, the drawings described are only some embodiments, from which other drawings can be created for a common person skilled in the art without need any creative work.

DETAILED DESCRIPTION OF THE DRAWINGS

Figure 1:
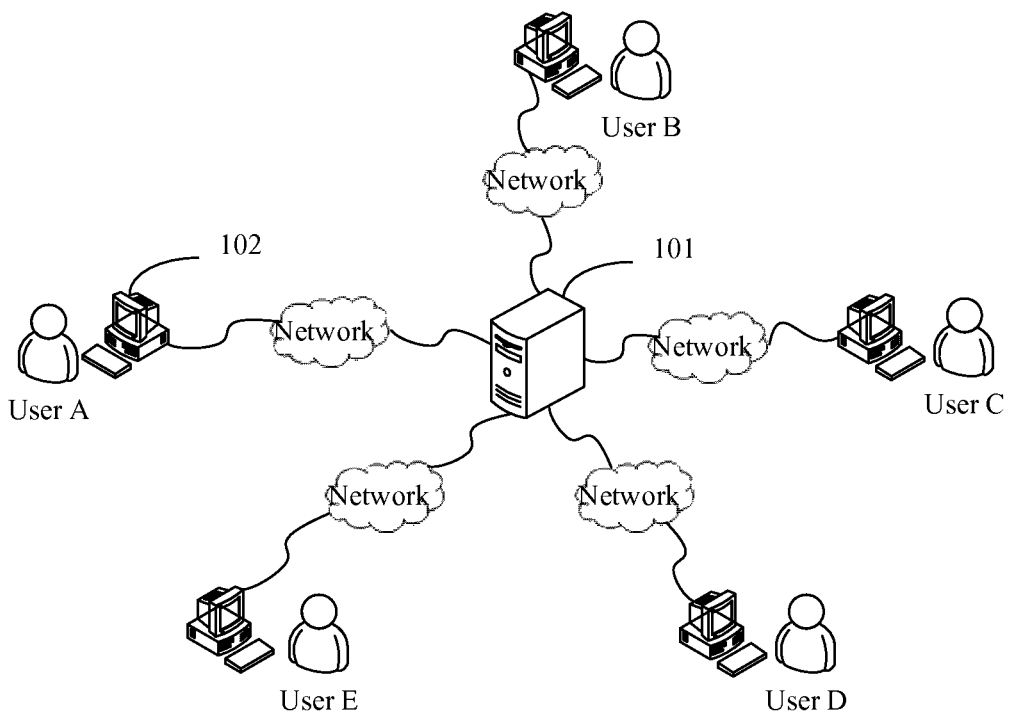
FIG. 1 is a schematic diagram of implementing environment for controlling the voice data transmission provided by an embodiment of the present disclosure.

For a better understanding of the aim, technical schemes and advantages of the present invention, example embodiments are described in detail in connection with the accompanying drawings as follows.

Reference throughout this specification to "one embodiment," "an embodiment," "an example embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an example embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "includes," and/or "including," when used in this specification, specify the presence of stated features, operations, elements, and/or components, but do not preclude the presence or addition of one or more other features, operations, elements, components, and/or groups thereof.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

An exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The communication network may include any appropriate type of communication network for providing network connections to the server and client or among multiple servers or clients. For example, communication network may include the Internet or other types of computer networks or telecommunication networks, either wired or wireless. In a certain embodiment, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device having a processor. In various embodiments, the client may include a network access device. The client can be stationary or mobile.

A server, as used herein, may refer to one or more server computers configured to provide certain server functionalities, such as database management and search engines. A server may also include one or more processors to execute computer programs in parallel.

The drawings need to be used in the description of the mode of execution of the present disclosure is described in detail as follow, so as to make the purpose, technical scheme and advantages in the present disclosure much clear.

The embodiments of the present disclosure provide a method for controlling the voice data transmission as shown in FIG. 1, this figure shows the structure schematic diagram of implementing environment which is related to the method for controlling the voice data transmission provided by the embodiments of the present disclosure. The implementing environment includes Server 101 and Multiple Terminals 102, which are configured with the apparatus for controlling the voice data transmission. The multiple terminals 102 may belong to a user group such as a user group using the same software, a user group playing the same game, or any other user groups.

Wherein, the apparatus for controlling the voice data transmission is described just as the apparatus for controlling the voice data transmission in the following an example embodiment, each Terminal 102 corresponds to each user. Each user can send voice data to Server 101, which is configured with the apparatus for controlling the voice data transmission, via his/her corresponding Terminal 102. Server 101, which is configured with the apparatus for controlling the voice data transmission, is configured to control the transmission of voice data sent by multiple Terminals 102. Server 101, which is configured with the apparatus for controlling the voice data transmission, and each Terminal 102 communicate through a network which may be wireless network or wired network.

Figure 2:
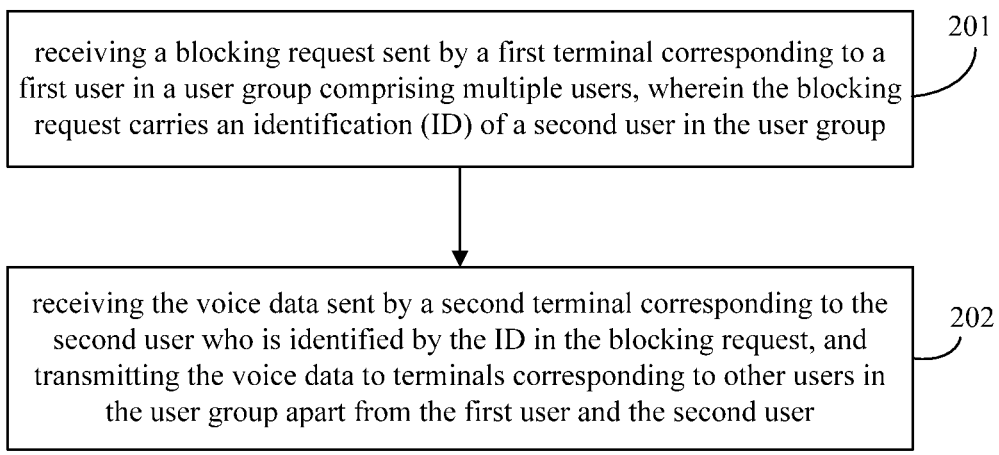
FIG. 2 is a flow diagram of the method for controlling the voice data transmission provided by an example embodiment of the present disclosure.

The embodiments of the present disclosure provide a method for controlling the voice data transmission as shown in FIG. 2, based on implementation of the method on the server side, the process of the method includes:

201: receiving, by a server device having a processor, a blocking request sent by a first terminal corresponding to a first user in a user group including multiple users, wherein the blocking request carries an identification (ID) of a second user in the user group; and 202: receiving, by the server device, the voice data sent by a second terminal corresponding to the second user who is identified by the ID in the blocking request, and transmitting the voice data to terminals corresponding to other users in the user group apart from the first user and the second user.

Preferably, after receiving the blocking request sent by the first terminal corresponding to the first user among multiple users, the step also includes:

If the first preset quantity of the blocking request carrying the ID of the second user is received, then block or cancel the transmission of the voice data sent by the terminal corresponding to the second user to terminals corresponding to other users among multiple users apart from the second user.

Preferably, after receiving the blocking request sent by the terminal corresponding to the first user among multiple users, the step also includes:

If the second preset quantity of the blocking request carrying the ID of the second user is received, then the server reduces the allowed duration of the voice data sent by the terminal corresponding to the second user who is identified by the ID.

After reducing the allowed duration of the voice data sent by the terminal corresponding to the second user who is identified by the ID, the step also includes:

If the times for reducing the allowed duration of the voice data sent by the terminal corresponding to the second user, who is identified by the ID, reaches the preset times, then the server blocks the transmission of the voice data sent by the terminal corresponding to the second user to other terminals corresponding to other users in the user group.

Furthermore, the method also includes:

The server sends a prompt message to the terminals corresponding to users, for whom the transmission of the voice data sent by the terminal corresponding to the second user is blocked, among multiple users; so as to make the terminals, which receive the prompt message, display the prompt message.

Preferably, before receiving the blocking request sent by the terminal corresponding to the first user among multiple users, the step also includes:

Setting the allowed duration of the voice data sent the first time by the terminal corresponding to each user as the preset range.

Preferably, after setting the allowed duration of the voice data sent the first time by the terminal corresponding to each user as the preset range, the step also includes:

Determining the length of waiting time between the previous time and the next time the voice data is sent by the terminal corresponding to each user;

Setting the allowed duration of the voice data sent the next time by the terminal corresponding to each user according to the length of waiting time, the preset range and the length of remaining time of the voice date sent the previous time by the terminal corresponding to each user;

Wherein, the length of remaining time of the voice date sent the previous time by the terminal corresponding to each user is the difference between the allowed duration of the voice data sent the previous time by the terminal corresponding to each user and the duration of the voice data sent the previous time by the terminal corresponding to each user.

Preferably, setting the allowed duration of the voice data sent the next time by the terminal corresponding to each user according to the length of waiting time, the preset range and the length of remaining time of the voice date sent the previous time by the terminal corresponding to each user, the step includes:

If the length of waiting time is less than or equal to the difference between the preset range and the length of remaining time of the voice date sent the previous time by the terminal corresponding to each user, then set the allowed duration of the voice data sent the next time by the terminal corresponding to each user to equal to the sum of the length of remaining time of the voice date sent the previous time by the terminal corresponding to each user plus the length of waiting time;

If the length of waiting time is greater than the difference between the preset range and the length of remaining time of the voice date sent the previous time by the terminal corresponding to each user, then set the allowed duration of the voice data sent the next time by the terminal corresponding to each user to equal to the preset range.

Preferably, the method also includes:

Counting a repetition time of the received voice data that have a duration greater than the preset allowed duration, and adjusting the allowed duration of the voice data set for the terminal corresponding to each user based on the repetition time.

Figure 3A:
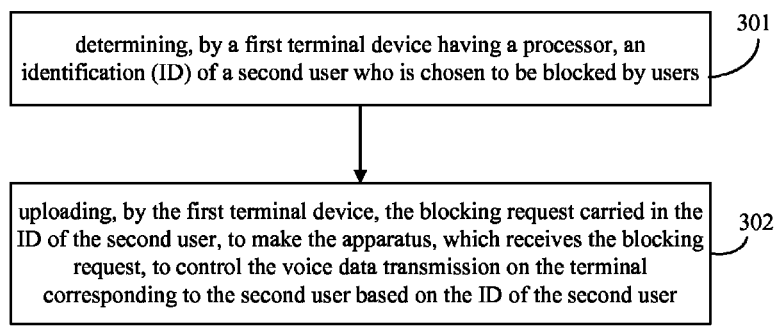
FIG. 3a is another flow diagram of the method for controlling the voice data transmission provided by an example embodiment of the present disclosure.

The embodiments of the present disclosure also provide a method for controlling the voice data transmission as shown in FIG. 3a, based on implementation of the method on the terminal, the process of the method includes:

301: the first terminal determines an identification (ID) of a second user who is chosen to be blocked by users.

302: the first terminal uploads the blocking request carried in the ID of the second user, to make the apparatus, which receives the blocking request, to control the voice data transmission on the terminal corresponding to the second user based on the ID of the second user.

Preferably, after uploading the blocking request carried in the ID of the second user, the step also includes:

Receiving the prompt message for cancelling the transmission of the voice data sent by the terminal corresponding to the second user, and displaying the prompt message.

In conclusion, in the method provided by the embodiment of the present disclosure, the server transmits the voice data sent by the terminal corresponding to the second user to the terminals corresponding to other users apart from the first user and the second user after received the blocking request carrying the ID of the second user sent by the terminal corresponding to the first user, which enables the terminal corresponding to the first user to block the voice data sent by the terminal corresponding to the second user immediately, so as to achieve the immediate and rapid voice data transmission control in a multi-user voice chat and optimize the voice chat environment effectively.

Figure 3B:
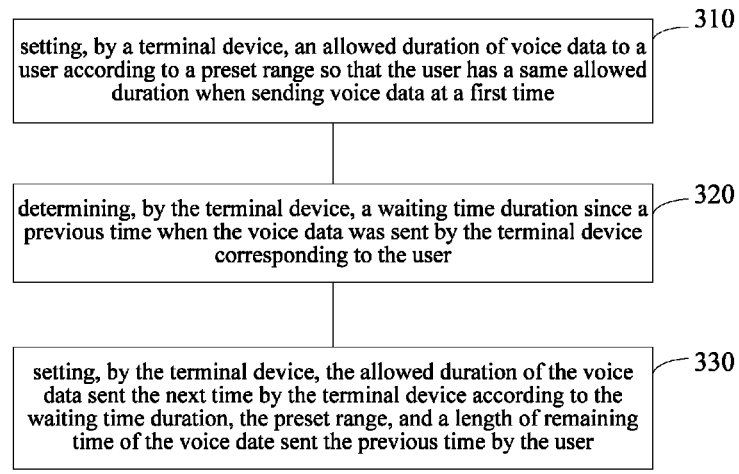
FIG. 3b is another flow diagram of the method for controlling the voice data transmission provided by an example embodiment of the present disclosure.

FIG. 3b shows an example flow diagram of the method for controlling the voice data transmission provided by an example embodiment of the present disclosure. The method is implemented in a terminal device having a processor. The method includes at least the following:

310: A terminal device sets an allowed duration of voice data to a user according to a preset range so that the user has a same allowed duration when sending voice data at a first time.

320: The first terminal device determines a waiting time duration since a previous time when the voice data was sent by the terminal device corresponding to the user.

330: The first terminal device sets the allowed duration of the voice data sent the next time by the terminal device according to the waiting time duration, the preset range, and a length of remaining time of the voice date sent the previous time by the user. The length of remaining time of the voice date sent the previous time by the user is the difference between the allowed duration of the voice data sent the previous time by any terminal device corresponding to the user and the duration of the voice data sent the previous time by the user.

Figure 4:
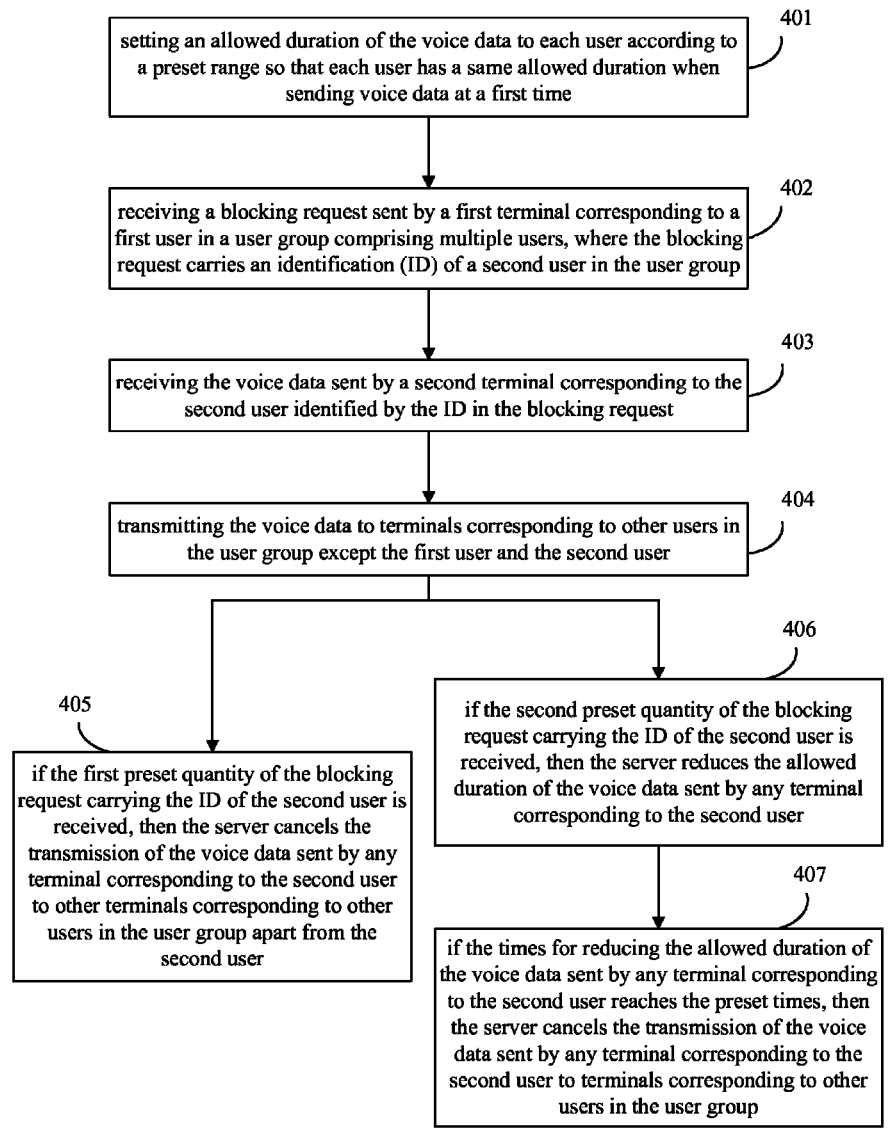
FIG. 4 is a flow diagram of the method for controlling the voice data transmission provided by an example embodiment of the present disclosure.

In order to control the voice data transmission in a multi-user voice chat effectively, the embodiment of the present disclosure provides a method for controlling the voice data transmission. The embodiment of the present disclosure describes the method for controlling the voice data transmission through examples which apply the method into the apparatus for controlling the voice data transmission, where the apparatus may execute the method separately or may be configured in other devices, e.g. the apparatus may be configured in the server or other devices to execute the method for controlling the voice data transmission. As shown in FIG. 4 and by combining the contents in the above embodiments, the method provided by the embodiment of the present disclosure includes:

401: setting an allowed duration of the voice data to each user according to a preset range so that each user has a same allowed duration when sending voice data at a first time.

For this step, in order to improve the multi-user voice chat environment, it may be necessary to control the duration of the voice data sent by the terminal corresponding to each user during multi-user voice chat. Thus, the server may set the allowed duration of the voice data sent the first time by the terminal corresponding to each user as the preset range. Here, the preset range may be set according to the actual situation, e.g. it can be set to 10 s, 15 s or 20 s etc. The embodiment of the present disclosure shall not limit the specific size of the preset range herein.

Multiple users can voice chat through each corresponding terminal after setting the allowed duration of the voice data sent the first time by the terminal corresponding to each user. The duration of the voice data sent the first time by the terminal corresponding to the user shall be within the preset range. After sending the voice data for the first time, the terminal corresponding to the user can immediately send the next voice data, of which the duration should also be within the preset range. Preferably, the duration of the voice data sent every time after sending the voice data for the first time can also be controlled, specifically either of the following two modes can be adopted:

Mode 1: Determining the length of waiting time between the previous time and the next time the voice data is sent by the terminal corresponding to each user; setting the allowed duration of the voice data sent the next time by the terminal corresponding to each user according to the length of waiting time, the preset range and the length of remaining time of the voice date sent the previous time by the terminal corresponding to each user.

Wherein, the length of remaining time of the voice date sent the previous time by the terminal corresponding to each user is the difference between the allowed duration of the voice data sent the previous time by the terminal corresponding to each user and the duration of the voice data sent the previous time by the terminal corresponding to each user. Setting the allowed duration of the voice data sent the next time by the terminal corresponding to each user according to the length of waiting time, the preset range and the length of remaining time of the voice date sent the previous time by the terminal corresponding to each user, the step specifically includes:

If the length of waiting time is less than or equal to the difference between the preset range and the length of remaining time of the voice date sent the previous time by the terminal corresponding to each user, then set the allowed duration of the voice data sent the next time by the terminal corresponding to each user to equal to the sum of the length of remaining time of the voice date sent the previous time by the terminal corresponding to each user plus the length of waiting time;

If the length of waiting time is greater than the difference between the preset range and the length of remaining time of the voice date sent the previous time by the terminal corresponding to each user, then set the allowed duration of the voice data sent the next time by the terminal corresponding to each user to equal to the preset range.

It may need to ensure that the set allowed duration of the voice data sent the next time by the terminal corresponding to each user is within the preset range usually when setting the allowed duration of the voice data sent the next time by the terminal corresponding to each user. When the waiting time is greater than the difference between the preset range and the length of the waiting time of the voice data sent the previous time by the terminal corresponding to each user, if still set the allowed duration of the voice data sent the next time by the terminal corresponding to each user to equal to the remaining time of the voice data sent the previous time by the terminal corresponding to each user plus the waiting time, then the allowed duration of the voice data sent the next time by the terminal corresponding to each user will be greater than the preset range, therefore, the allowed duration of the voice data sent the next time by the terminal corresponding to each user will be directly set as the preset range.

For example, take the terminal corresponding to user A as shown in FIG. 1 as an example, after setting the allowed duration of the voice data sent the first time by the terminal corresponding to user A as 10 s and the terminal corresponding to user A send a voice data of 8 s, then the length of remaining time of the voice data sent the first time by the terminal corresponding to user A is 10 s−8 s=2 s; the terminal corresponding to user A send the voice data for the second time after waiting 5 s, due to that the waiting time is less than the difference (5 s<10 s−2 s=8 s) between the preset range and the length of the remaining time of the voice data sent the first time, so that the allowed duration of the voice data sent the second time by the terminal corresponding to user A is determined to be 2 s+5 s=7 s. The terminal corresponding to user A send a voice data of 3 s for the second time, so the length of the remaining time of the voice data sent the second time is 7 s−3 s=4 s. The terminal corresponding to user A send a voice data for the third time after waiting 9 s, due to that the waiting time is greater than the difference (9 s>10 s−4 s=6 s) between the preset range and the length of the remaining time of the voice data sent the second time, so that the allowed duration of the voice data sent the third time by the terminal corresponding to user A is determined to be preset range which is 10 s.

Mode 2: Determining the length of waiting time between the previous time and the next time the voice data is sent by the terminal corresponding to each user, setting the allowed duration of the voice data sent the next time by the terminal corresponding to each user according to the length of waiting time.

Wherein, setting the allowed duration of the voice data sent the next time by the terminal corresponding to each user according to the length of waiting time, the step specifically includes: if the waiting time reaches the preset threshold, then set the allowed duration of the voice data sent the next time by the terminal corresponding to each user as the preset range; if the waiting time is less than the preset threshold, then set the allowed duration of the voice data sent the next time by the terminal corresponding to each user as the length of waiting time of the voice data sent the previous time by the terminal corresponding to each user. The length of remaining time of the voice date sent the previous time by the terminal corresponding to each user is the difference between the allowed duration of the voice data sent the previous time by the terminal corresponding to each user and the duration of the voice data sent the previous time by the terminal corresponding to each user.

For the above-mentioned mode, after the terminal corresponding to each user send the voice date the previous time, the user should wait some time which is equal to the preset threshold, then the user can send the voice data of the preset range again; if the waiting time is less than the preset threshold, then the user can only have the remaining time of the voice data sent the previous time for sending voice data.

For example, take the terminal corresponding to user A as shown in FIG. 1 as an example, after setting the allowed duration of the voice data sent the first time by the terminal corresponding to user A as 10 s and the terminal corresponding to user A send a voice data of 8 s, if the terminal corresponding to user A send the voice data for the second time after waiting 6 s, due to that the length of waiting time between the first time and the second time the voice data is sent is 6 s, which reaches the preset threshold 5 s, so that the allowed duration of the voice data sent the second time by the terminal corresponding to user A is 10 s. If the terminal corresponding to user A send the voice data for the second time after waiting 3 s, due to that the length of waiting time between the first time and the second time the voice data is sent is 3 s, which is less than the preset threshold 5 s, then the allowed duration of the voice data sent the second time by the terminal corresponding to user A is set to be 10 s−8 s=2 s, which is the length of the remaining time of the voice data sent the first time by the terminal corresponding to user A.

Certainly, in addition to the above-mentioned mode 1 and 2, the allowed duration of the voice data sent by the terminal corresponding to each user may also be controlled by adopting other modes, for the specific mode for controlling the allowed duration of the voice data sent by the terminal corresponding to each user, which shall not be specifically limited in the embodiment of the present disclosure.

In the specific implementation, after setting the allowed duration of the voice data sent the next time by the terminal corresponding to the user each time, the information of the allowed duration of the voice data sent the next time can be displayed on the screen of the terminal corresponding to the user, so that the user would know the allowed duration of the voice data sent the next time from the displayed information. The voice data sent the next time by the terminal corresponding to the user is required to meet the configured allowed duration, the terminal corresponding to the user send the voice data, which meet the configured allowed duration, to the apparatus for controlling the voice data transmission, then the apparatus transmits the voice data, which meet the configured allowed duration, to the terminals corresponding to other users among multiple users apart from the user corresponding to the terminal which should send the voice data. For example, take the implementing environment as shown in FIG. 1 as an example, the allowed duration of the voice data sent this time by the terminal corresponding to user A is 10 s, the terminal corresponding to user A send the voice data of 8 s to the apparatus for controlling the voice data transmission; the apparatus transmits the voice data of 8 s to the terminals corresponding to other users from B to E apart from user A after receiving the voice data of 8 s sent by the terminal corresponding to user A.

If the duration of the voice data sent the next time by the terminal corresponding to the user exceeds the configured allowed duration, then the apparatus for controlling the voice data transmission can only receive the voice data, which is within the configured allowed duration, sent the next time by the terminal corresponding to the user, and refuse to receive the voice data which exceeds the configured allowed duration; or the apparatus may receive the voice data, which exceeds the configured allowed duration, sent the next time by the terminal corresponding to the user, and transmits the voice data, which is within the configured allowed duration, to terminals corresponding to other user.

The terminal corresponding to each user can adopt the sending method of using keys during sending voice data, i.e. after the user presses the preset key on the keyboard, the terminal corresponding to the user confirms the key information and access the voice data entered by the user, then the terminal sends the key information and the voice data to the apparatus for controlling the voice data transmission. Therefore, when the apparatus for controlling the voice data transmission receives the voice data sent by the terminal corresponding to each user, the step specifically includes: receiving the key information and the voice data sent by the terminal corresponding to each user. Certainly, the terminal corresponding to each user may also choose other methods of sending voice data, e.g. after confirming that the user clicked the preset option in the screen, the terminal corresponding to the user confirms the option information clicked by the user, and access the voice data entered by the user, and also sends the option information and the voice data to the apparatus for controlling the voice data transmission. Accordingly, when the apparatus for controlling the voice data transmission receives the voice data sent by the terminal corresponding to each user, the step specifically includes: receiving the option information and the voice data sent by the terminal corresponding to each user. For the specific methods of sending the voice data sent by the terminal corresponding to each user and the specific methods of receiving the voice data sent by the terminal corresponding to each user adopted by the apparatus for controlling the voice data transmission, which shall not be specifically limited in the embodiment of the present disclosure.

Furthermore, in order to reasonably control the duration of the voice data sent by the terminal corresponding to each user, the configured allowed duration of the voice data may also be constantly adjusted according to the actual situation. The method specifically includes: counting the quantity of the received voice data, of which the duration is greater than the preset allowed duration, and adjusting the allowed duration of the voice data set for the terminal corresponding to each user based on the repetition time.

Wherein, the preset allowed duration may be determined according to the allowed duration of the voice data sent this time by the terminal corresponding to each user. In order to adjust the allowed duration of the voice data set by the terminal corresponding to each user, the apparatus for controlling the voice data transmission receives the voice data, of which the duration is greater than the preset allowed duration, sent by the terminal corresponding to the user, and count the quantity of the voice data which exceeds the preset allowed duration; when the repetition time reaches the preset quantity, it indicates that the allowed duration of the voice data set for the terminal corresponding to each user is not reasonable, so the allowed duration of the voice data set for the terminal corresponding to each user can increase. Specifically, the configured allowed duration of the voice data sent each time by the terminal corresponding to each user can be adjusted by adjusting the allowed duration of the voice data sent the first time by the terminal corresponding to the user, i.e. adjusting the preset range.

For example, when the quantity of the voice data, of which the duration is greater than the preset allowed duration, reaches 1000 that is greater than the preset quantity, then adjust the preset range of the voice data sent the first time by the terminal corresponding to each user from 10 s to 15 s, so as to adjust allowed duration of the voice data sent subsequently each time by the terminal corresponding to the user.

In the specific implementation, after execute step 401 for the first time, step 402 to step 407 can be directly executed subsequently without continuing executing step 401. Certainly, when it needs to update the allowed duration of the voice data sent the first time by the terminal corresponding to the user, step 401 can be selected to be executed.

During the process of multi-user voice chat, the duration of the voice data sent by the terminal corresponding to the user can be controlled by setting the allowed duration of the voice data sent the first time by the terminal corresponding to each user and setting the allowed duration of the voice data sent subsequently each time by the terminal corresponding to the user, which is provided by the above-mentioned step 401. In order to control the voice data transmission in a multi-user voice chat effectively and optimize multi-user voice chat environment, following step 402 to step 407 can be executed subsequently.

402: receiving the blocking request sent by the first terminal corresponding to a first in a user group including multiple users, where the blocking request carries an identification (ID) of a second user in the user group.

For this step, the terminal corresponding to the first user can display the blocking options corresponding to other users among multiple users apart from the first user, when the first user needs to block the voice data sent by the terminal corresponding to the second user, the blocking options corresponding to the second user displayed in the terminal corresponding to the first user can be selected; the terminal corresponding to the first user determines the ID of the second user who is selected to be blocked after the first user select the blocking options corresponding to the second user, and sends the ID of the second user carried in the blocking request to the apparatus for controlling the voice data transmission, so as to make the apparatus for controlling the voice data transmission to receive the blocking request sent by the terminal corresponding to the first user. Wherein, the ID of the second user can be configured to identify the second user, the ID of the second user may be the registered user ID in the voice chat tool, or may be other ID of the second user which can be identified, which shall not be specifically limited in the embodiment of the present disclosure.

Figure 5:
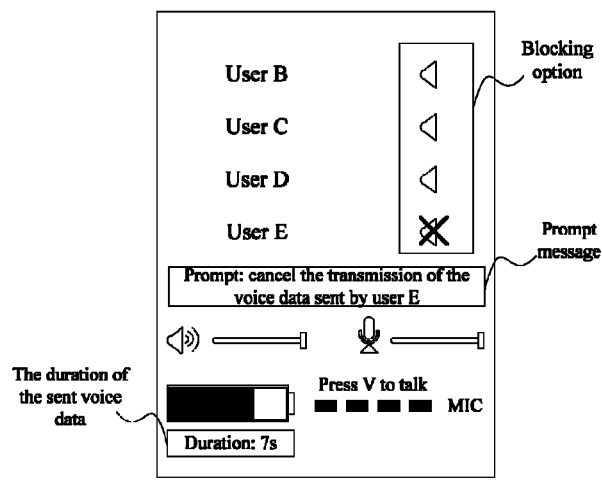
FIG. 5 is a schematic diagram for display of terminal interface provided by an example embodiment of the present disclosure.

For example, take the interface displayed on the terminal corresponding to user A during multi-user voice chat as shown in FIG. 5 as an example, if user A needs to block the voice data sent by user E, then user A can select the blocking option corresponding to user E displayed in the interface, after this procedure is done, the terminal corresponding to user A determines the ID of user E, and sends the ID of user E carried in the blocking request to the apparatus for controlling the voice data transmission, so as to make the apparatus for controlling the voice data transmission receive the blocking request sent by the terminal corresponding to user A.

403: receiving the voice data sent by a second terminal corresponding to the second user identified by the ID in the blocking request.

In this step, the duration of the voice data sent by the terminal corresponding to the second user can be limited by adopting the modes in step 401.

It is important to note that the sequence of step 402 and step 403 is not limited. Either of step 402 or step 403 can be executed first while the other is executed afterward, or both can be executed at the same time.

404: transmitting the voice data to terminals corresponding to other users of the user group except the first user and the second user.

For this step, due to that the blocking request carrying the ID of the second user sent by the terminal corresponding to the first user is received in step 402, it can be seen that the first user don't want to receive the voice data sent by the second user. Therefore, the apparatus for controlling the voice data transmission transmits the voice data to terminals corresponding to other users among multiple users apart from the first user and the second user after receiving the voice data sent by the terminal corresponding to the second user. At this time, if the ID of the second user carried in the blocking request can identify the second user, even if the second user use another terminal to send voice data, the apparatus for controlling the voice data transmission can also transmits the voice data, which is sent by another terminal corresponding to the second user, to terminals corresponding to other users among multiple users apart from the first user and the second user, so as to make the first user no longer receive the voice data sent by the second user, thus achieving blocking the voice data sent by the second user.

In order to make the first user knows that the terminal corresponding to the first user will no longer receive the voice data sent by the terminal corresponding to the second user, the apparatus for controlling the voice data transmission can also send prompt message to the terminal corresponding to the first user, the prompt message is configured to prompt that the transmission of the voice data sent by the terminal corresponding to the second user to the terminal corresponding to the first user is cancelled. The terminal corresponding to the first user displays the prompt message after receiving it. The first user can know form the prompt message displayed on the terminal corresponding to the first user that he/she will no longer receive the voice data sent by the terminal corresponding to the second user.

For example, due to that the apparatus for controlling the voice data transmission receive the blocking request carrying the ID of user E sent by the terminal corresponding to user A in step 402, after receiving the voice data sent by the terminal corresponding to user E, the voice data will be transmitted to the terminal corresponding to user B, C and D, but not to the terminal corresponding to user A. The apparatus for controlling the voice data transmission also send prompt message to the terminal corresponding to user A, the prompt message is configured to prompt that the transmission of the voice data sent by the terminal corresponding to user E to the terminal corresponding to user A is cancelled, so that user A can know form the displayed prompt message that the terminal corresponding to user A will no longer receive the voice data sent by the terminal corresponding to user E.

Due to that the terminal corresponding to the second user can constantly send voice data to the apparatus for controlling the voice data transmission, the apparatus can kept transmitting the voice data sent by the terminals corresponding to the second user to the terminals corresponding to other users among multiple users apart from the first user and the second user after receiving the blocking request sent by the terminal corresponding to the first user, so that the terminal corresponding to the first user will no longer receive the voice data sent by the terminal corresponding to the second user. Certainly, the apparatus for controlling the voice data transmission may also transmits the voice data sent by the terminals corresponding to the second user to the terminals corresponding to other users among multiple users apart from the first user and the second user within a certain period of time, after the certain period of time, it will be restored that the voice data sent by the terminal corresponding to the second user is transmitted to the terminals corresponding to other users apart from the second user. Certainly, if the terminal corresponding to the first user still doesn't want to receive the voice data sent by the terminal corresponding to the second user at this time, then the voice data sent by the terminal corresponding to the second user can be blocked by adopting the modes in the above-mentioned step 402 to step 404.

For example, during the process of online team games, if the blocking request carrying the ID of the second user sent by the terminal corresponding to the first user is received in the current round of the game, then transmit the voice data sent by the terminal corresponding to the second user to the terminals corresponding to other users apart from the first user and the second user in the current round of the game. When the next round of game begins, it will be stored that the voice data sent by the terminal corresponding to the second user is transmitted to the terminals corresponding to other users apart from the second user, i.e. the terminal corresponding to the first user can also receive the voice data sent by the terminal corresponding to the second user.

It is important to note that the transmission of the voice data sent by the terminal corresponding to the second user to the terminal corresponding to the first user can be blocked in the above-mentioned step 402 to step 404; the terminals corresponding to other users, who don't transmit the blocking request carrying the ID of the second user to the apparatus for controlling the voice data transmission, can still receive the voice data sent by the terminal corresponding to the second user. If the voice data sent by the terminal corresponding to the second user contains some malicious content, which can still cause adverse effect on the multi-user voice chat environment, other users may also adopt the same mode as the first user by sending the blocking request carrying the ID of the second user to the apparatus for controlling the voice data transmission via his/her corresponding terminal; for this, the method provided by the present embodiment may also adopt the following step 405 or step 406 to step 407 to further control the voice data sent by the terminal corresponding to the second user.

405: if the first preset quantity of the blocking request carrying the ID of the second user is received, then the server cancels the transmission of the voice data sent by any terminal corresponding to the second user to other terminals corresponding to other users in the user group apart from the second user.

Here, the first preset quantity can be specifically set according to the actual situation. Whenever one piece of the blocking request carrying the ID of the second user is received, then accumulate the quantity of the blocking request. The quantity of the blocking request can be accumulated in a certain cycle predetermined by the user group or the server administrator, when the quantity of the blocking request does not reach the first preset quantity in a certain cycle, then clear the quantity of the blocking request, and re-accumulate the quantity of the blocking request in the next cycle. Certainly, the quantity of the blocking request may also be accumulated constantly until the quantity of the blocking request reaches the first preset quantity.

When the quantity of the blocking request carrying the ID of the second user reaches the first preset quantity, then the server cancels the transmission of the voice data sent by the terminal corresponding to the second user to terminals corresponding to other users among multiple users apart from the second user. At this time, the terminal corresponding to the user, who does not send the blocking request carrying the ID of the second user, will also not receive the voice data sent by the terminal corresponding to the second user, i.e. the voice data sent by the terminal corresponding to the second user is blocked and cannot be received by the other terminals corresponding to the other users in the user group. The apparatus for controlling the voice data transmission may not receive the voice data sent by the terminals corresponding to the second user, so that the cancelling for transmission of the voice data sent by the terminal corresponding to the second user to terminals corresponding to other users among multiple users apart from the second user can be achieved; or the apparatus may also continue receiving the voice data sent by the terminal corresponding to the second user, but refuse to transmit the voice data sent by the terminals corresponding to the second user to the terminals corresponding to other users among multiple users apart from the second user, thus the cancelling for transmission of the voice data sent by the terminal corresponding to the second user to terminals corresponding to other users among multiple users apart from the second user can be achieved.

In order to make the user, for whom the transmission of the voice data sent by the terminal corresponding to the second user is cancelled, knows that he/she will no longer receive the voice data sent by the terminal corresponding to the second user, the apparatus for controlling the voice data transmission may also send prompt message to the terminal corresponding to the user, for whom the transmission of the voice data sent by the terminal corresponding to the second user is cancelled; the terminal which receives the prompt message can display the prompt message, so as to make the user, for whom the transmission of the voice data sent by the terminal corresponding to the second user is cancelled, knows from the displayed prompt message that the voice data sent by the terminal corresponding to the second user is blocked.

For example, still take the implementing environment as shown in FIG. 1 as an example, the apparatus for controlling the voice data transmission receive the blocking request carrying the ID of user E sent by the terminal corresponding to user A, B and C, then the quantity of the blocking request carrying the ID of user E is accumulated with 3; when the quantity reaches the first preset quantity, then cancel the transmission of the voice data sent by the terminal corresponding to user E to the terminal corresponding to user A to D. At this time, although the terminal corresponding to user D does not send the blocking request carrying the ID of user E to the apparatus for controlling the voice data transmission, the terminal corresponding to user D will not receive the voice data sent by the terminal corresponding to user E. The apparatus for controlling the voice data transmission also send the prompt message to the terminals corresponding to user A to D, the prompt message is configured to prompt that the transmission of the voice data sent by the terminal corresponding to user E to the terminals corresponding to user A to D is cancelled. The terminals corresponding to user A to D display the prompt message after receiving the prompt message sent by the apparatus for controlling the voice data transmission.

It is important to note that after the quantity of the blocking request carrying the ID of user E reaches the first preset quantity, and then constantly cancel the transmission of the voice data sent by the terminal corresponding to the second user to terminals corresponding to other users among multiple users apart from the second user; or cancel the transmission of the voice data sent by the terminal corresponding to the second user to terminals corresponding to other users among multiple users apart from the second user in a certain period of time after the quantity of the blocking request carrying the ID of user E reaches the first preset quantity, and after the certain period of time, it will be restored that the voice data sent by the terminal corresponding to the second user is transmitted to the terminals corresponding to other users apart from the second user.

Apart from the method supplied in step 405 to control the transmission of the voice data sent by the terminal corresponding to the second user, the method supplied in the following step 406 to step 407 can also be adopted to control the transmission of the voice data sent by the terminal corresponding to the second user.

406: if the second preset quantity of the blocking request carrying the ID of the second user is received, then the server reduces the allowed duration of the voice data sent by any terminal corresponding to the second user identified by the ID.

Wherein, the second preset quantity can be set according to the actual situation, the second preset quantity can be the same as or different from the first preset quantity, the embodiment of the present disclosure shall not specifically limit the second preset quantity herein. Whenever the blocking request carrying the ID of the second user is received, then accumulate the quantity of the blocking request. When accumulating the quantity of the blocking request, it can be accumulated in a certain cycle, when the quantity of the blocking request does not reach the second preset quantity in a certain cycle, then clear the quantity of the blocking request, and re-accumulate the quantity of the blocking request in the next cycle; or the quantity of the blocking request may also be accumulated constantly until the quantity of the blocking request reaches the second preset quantity.

When the quantity of the blocking request carrying the ID of the second user reaches the preset quantity, then the server reduces the allowed duration of the voice data sent by any terminal corresponding to the second user who is identified by the ID. Wherein, the allowed duration of the voice data sent by the terminal corresponding to the second user may be the preset range in step 401, or may be the allowed duration reset subsequently. Whenever reducing the allowed duration of the voice data sent by the terminal corresponding to the second user, the procedure is done according to the allowed duration of the voice data sent by the terminal corresponding to the second user. The specific reducing may be done according to a fixed proportion, e.g. reducing 50% of the allowed duration of the voice data sent by the terminal corresponding to the current second user; or the reducing may be done according to a fixed value, e.g. reducing the allowed duration of the voice data sent by the terminal corresponding to the current second user by 5 s; the embodiment of the present disclosure shall not specifically limit the method of reducing the allowed duration of the voice data sent by the terminal corresponding to the second user and the fixed proportion or value in the reducing herein.

For example, still take the implementing environment as shown in FIG. 1 as an example, the apparatus for controlling the voice data transmission receive the blocking request carrying the ID of user E sent by the terminal corresponding to user A and B within 1 hour, then the quantity of the blocking request carrying the ID of the second user is accumulated with 2; when the quantity reaches the second preset quantity, then reduce the allowed duration of the voice data sent by the terminal corresponding to user E from 10 s to 5 s.

It is important to note that after the quantity of the blocking request carrying the ID of the second user reaches the second preset quantity and the allowed duration of the voice data sent by the terminal corresponding to the second user is reduced, then clear the quantity of the blocking request so as to subsequently continue accumulating the quantity of the blocking request. If the quantity of the blocking request carrying the ID of the second user reaches the second preset quantity again, then reduce the allowed duration of the voice data sent by the terminal corresponding to the second user again based on previously reduced allowed duration of terminal corresponding to the second user. After reducing the allowed duration of the voice data sent by the terminal corresponding to the second user each time, the allowed duration of the voice data sent by the terminal corresponding to the second user may be kept in the reduced allowed duration, when the quantity of the blocking request carrying the ID of the second user reaches the second preset quantity again, then reduce the allowed duration of the voice data sent by the terminal corresponding to the second user again based on previously reduced allowed duration of terminal corresponding to the second user; in addition, the allowed duration of the voice data sent by the terminal corresponding to the second user may be kept as the reduced allowed duration in a certain period of time, after the certain period of time, restore the allowed duration of the voice data sent by the terminal corresponding to the second user to the allowed duration prior to reducing, so that when reducing the allowed duration of the voice data sent by the terminal corresponding to the second user again, still reduce the allowed duration of the voice data sent by the terminal corresponding to the second user again according to the previous allowed duration of the voice data sent by the terminal corresponding to the second user. Wherein, the allowed duration of the voice data sent by the terminal corresponding to the second user may be reduced with the same proportion or length; or the allowed duration of the voice data sent by the terminal corresponding to the second user may be reduced with different proportion or length, which shall not be specifically limited in the embodiment of the present disclosure.

It is important to note that when controlling the transmission of the voice data sent by the terminal corresponding to the second user, step 406 can be executed only, or step 407 can be selected to be executed continually based on step 406.

407: if the times for reducing the allowed duration of the voice data sent by any terminal corresponding to the second user reaches the preset times, then the server cancels the transmission of the voice data sent by any terminal corresponding to the second user to terminals corresponding to other users in the user group.

Here, the preset times can be set according to the actual situation, it can be set to 2 or 3 etc., which shall not be specifically limited in the embodiment of the present disclosure. Whenever the number of the first users sending the block requests reaches the second preset quantity, the server reduces the allowed duration of the voice data sent by the terminal corresponding to the second user, and accumulate the times for reducing the allowed duration of the voice data sent by the terminal corresponding to the second user. When accumulating the times for reducing the allowed duration of the voice data sent by the terminal corresponding to the second user, the times for reducing the allowed duration of the voice data sent by the terminal corresponding to the second user can be accumulated in a certain cycle; when the times for reducing the allowed duration of the voice data sent by the terminal corresponding to the second user does not reach the preset times, then clear the times for reducing the allowed duration of the voice data sent by the terminal corresponding to the second user, and re-accumulate the times for reducing the allowed duration of the voice data sent by the terminal corresponding to the second user in next cycle. In addition, the times for reducing the allowed duration of the voice data sent by the terminal corresponding to the second user may be accumulated constantly until the times for reducing the allowed duration of the voice data sent by the terminal corresponding to the second user reaches the preset quantity.

When the times for reducing the allowed duration of the voice data sent by the terminal corresponding to the second user reaches the preset times, then cancel the transmission of the voice data sent by the terminal corresponding to the second user to terminals corresponding to other users among multiple users apart from the second user. At this time, the terminal corresponding to the user, who does not send the blocking request carrying the ID of the second user, will also not receive the voice data sent by the terminal corresponding to the second user, i.e. the voice data sent by the terminal corresponding to the second user cannot be received by the terminals corresponding to other users. The apparatus for controlling the voice data transmission may not receive the voice data sent by the terminals corresponding to the second user, so that the cancelling for transmission of the voice data sent by the terminal corresponding to the second user to terminals corresponding to other users among multiple users apart from the second user can be achieved; or the apparatus may also continue receiving the voice data sent by the terminal corresponding to the second user, but refuse to transmit the voice data sent by the terminals corresponding to the second user to the terminals corresponding to other users among multiple users, thus the cancelling for transmission of the voice data sent by the terminal corresponding to the second user to terminals corresponding to other users among multiple users apart from the second user can be achieved.

In order to make the user, for whom the transmission of the voice data sent by the terminal corresponding to the second user is cancelled, knows that he/she will no longer receive the voice data sent by the terminal corresponding to the second user, the apparatus for controlling the voice data transmission may also send prompt message to the terminal corresponding to the user, for whom the transmission of the voice data sent by the terminal corresponding to the second user is cancelled. Displaying the prompt message after the terminal corresponding to the user, for whom the transmission of the voice data sent by the terminal corresponding to the second user is cancelled, receives the prompt message. The user, for whom the transmission of the voice data sent by the terminal corresponding to the second user is cancelled, knows from the displayed prompt message that he/she will no longer receive the voice data sent by the terminal corresponding to the second user.

For example, the apparatus for controlling the voice data transmission reduce the allowed duration of the voice data sent by the terminal corresponding to user E for 3 times in 6 hours, the times for reducing the allowed duration of the voice data sent by the terminal corresponding to user E reaches the preset times, then cancel the transmission of the voice data sent by the terminal corresponding to user E to user A to D. The apparatus for controlling the voice data transmission also send the prompt message to the terminals corresponding to user A to D, the prompt message is configured to prompt that the transmission of the voice data sent by the terminal corresponding to user E to the terminals corresponding to user A to D is cancelled. The terminals corresponding to user A to D display the prompt message after receiving the prompt message sent by the apparatus for controlling the voice data transmission.

In the specific implementation, the transmission of the voice data sent by the terminal corresponding to the second user can be further controlled by adopting the method supplied in the above-mentioned step 405 based on step 402 to step 404, or the transmission of the voice data sent by the terminal corresponding to the second user can also be further controlled by adopting the method supplied in the above-mentioned step 406 to step 407; for the specific method, which shall not be specifically limited in the embodiment of the present disclosure. It should be further noted that any of the above steps in FIG. 4 may be implemented at least partially in a terminal device or a server.

In conclusion, in the method provided by the embodiment of the present disclosure, the voice data sent by the terminal corresponding to the second user is transmitted to the terminals corresponding to other users apart from the first user and the second user after received the blocking request carrying the ID of the second user sent by the terminal corresponding to the first user, which enables the terminal corresponding to the first user to block the voice data sent by the terminal corresponding to the second user immediately, so as to achieve the immediate and rapid voice data transmission control in a multi-user voice chat and optimize the voice chat environment effectively. Furthermore, the voice data sent by the terminal corresponding to the second user can be further controlled and voice chat environment can be further optimized after receiving the blocking request carrying the ID of the terminal corresponding to the second user, which is sent by the terminal corresponding to multiple first users.

Figure 6:
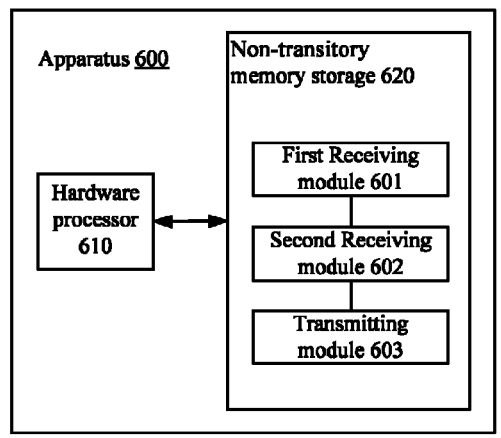
FIG. 6 is the structure schematic diagram of the first apparatus for controlling the voice data transmission provided by an example embodiment of the present disclosure.

The embodiment of the present disclosure provides an apparatus for controlling the voice data transmission, the apparatus is configured to execute the method for controlling the voice data transmission in the above-mentioned embodiment 1 or 2. As shown in FIG. 6, the apparatus 600 includes a hardware processor 610 and a non-transitory storage medium 620 accessible to the hardware processor 610. The non-transitory storage medium 620 is configured to store at least the following modules implemented by the hardware processor 610:

The First Receiving module 601 is configured to receive the blocking request sent by the terminal corresponding to the first user among multiple users, wherein the blocking request carries the identification ID of the second user among multiple users;

The Second Receiving module 602 is configured to receive the voice data sent by the terminal corresponding to the second user who is identified by the ID in the blocking request received by the First Receiving module 601;

Transmitting module 603 is configured to transmit the voice data received by the Second Receiving module 602 to terminals corresponding to other users among multiple users apart from the first user and the second user.

Figure 7:
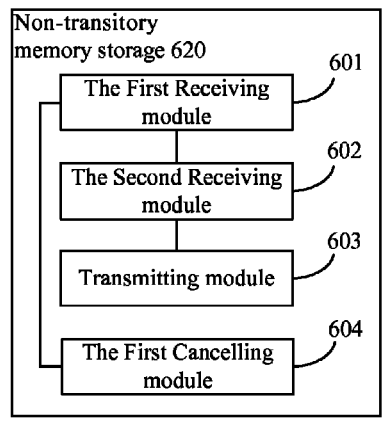
FIG. 7 is the structure schematic diagram of the second apparatus for controlling the voice data transmission provided by an example embodiment of the present disclosure.

Preferably as shown in FIG. 7, the apparatus also includes:

The First Cancelling module 604 is configured to cancel the transmission of the voice data sent by the terminal corresponding to the second user to terminals corresponding to other users among multiple users apart from the second user when the first preset quantity of the blocking request carrying the ID of the second user is received.

Figure 8:
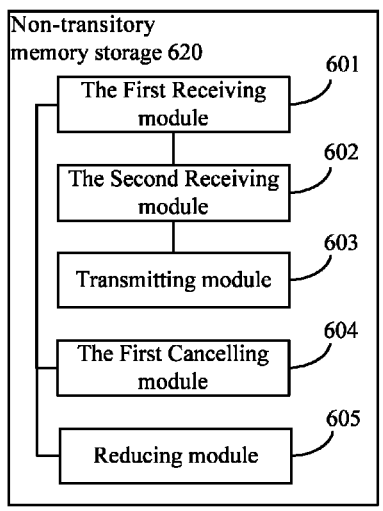
FIG. 8 is the structure schematic diagram of the third apparatus for controlling the voice data transmission provided by an example embodiment of the present disclosure.

Preferably as shown in FIG. 8, the apparatus also includes:

Reducing module 605 is configured to reduce the allowed duration of the voice data sent by the terminal corresponding to the second user who is identified by the ID when the second preset quantity of the blocking request carrying the ID of the second user is received.

Figure 9:
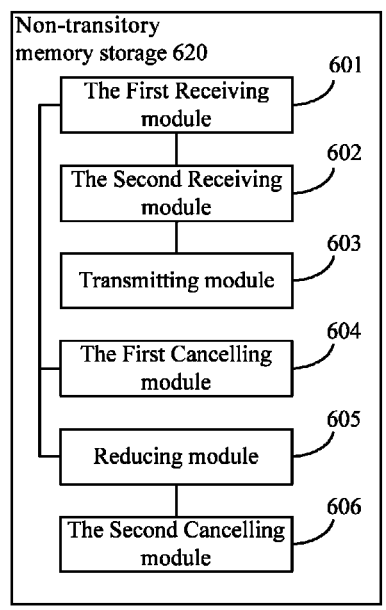
FIG. 9 is the structure schematic diagram of the fourth apparatus for controlling the voice data transmission provided by an example embodiment of the present disclosure.

Preferably as shown in FIG. 9, the apparatus also includes:

The Second Cancelling module 606 is configured to cancel the transmission of the voice data sent by the terminal corresponding to the second user to terminals corresponding to other users among multiple users apart from the second user when the times for reducing the allowed duration of the voice data sent by the terminal corresponding to the second user, who is identified by the ID, reaches the preset times.

Figure 10:
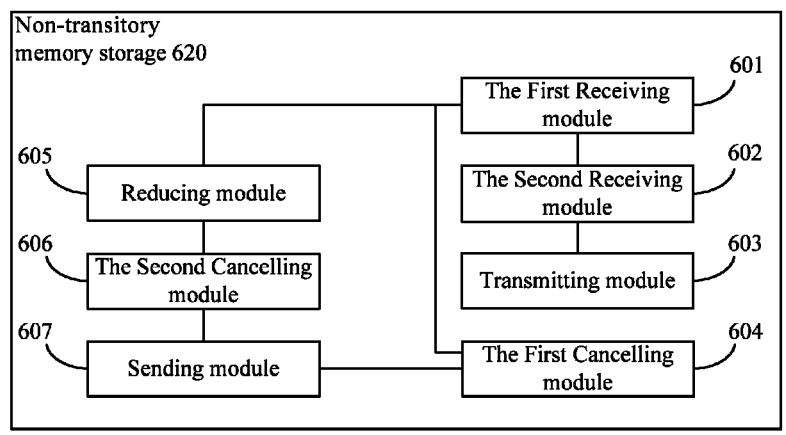
FIG. 10 is the structure schematic diagram of the fifth apparatus for controlling the voice data transmission provided by an example embodiment of the present disclosure.

Preferably as shown in FIG. 10, the apparatus also includes:

Sending module 607 is configured to send the prompt message to the terminals corresponding to users, for whom the transmission of the voice data sent by the terminal corresponding to the second user is cancelled, among multiple users; so as to make the terminal, which receives the prompt message, display the prompt message.

Figure 11:
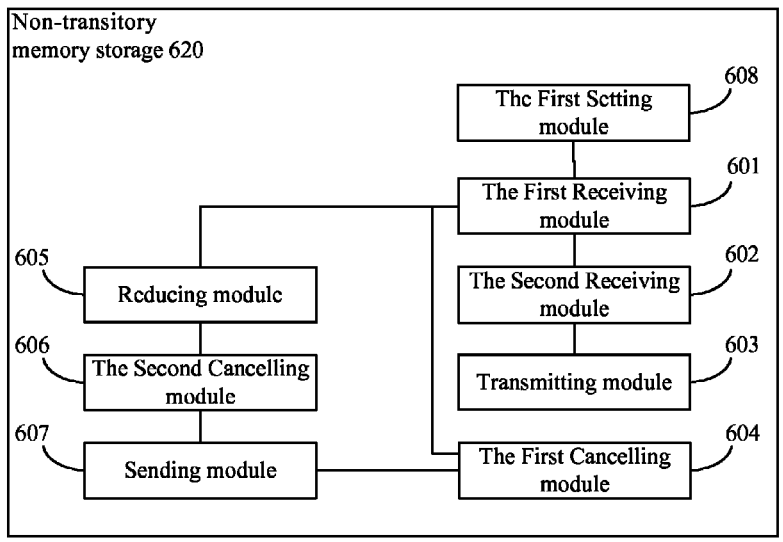
FIG. 11 is the structure schematic diagram of the sixth apparatus for controlling the voice data transmission provided by an example embodiment of the present disclosure.

Preferably as shown in FIG. 11, the apparatus also includes:

The First Setting module 608 is configured to set the allowed duration of the voice data sent the first time by the terminal corresponding to each user as the preset range.

Figure 12:
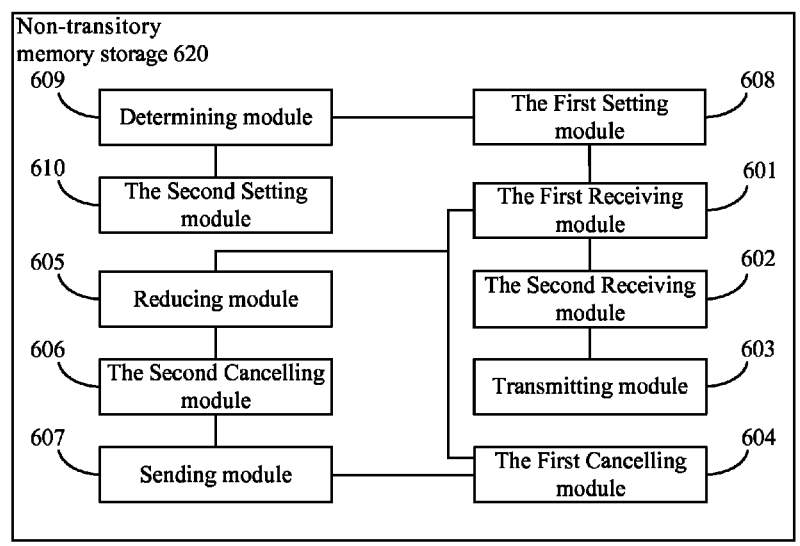
FIG. 12 is the structure schematic diagram of the seventh apparatus for controlling the voice data transmission provided by an example embodiment of the present disclosure.

Preferably as shown in FIG. 12, the apparatus also includes:

Determining module 609 is configured to determine the length of waiting time between the previous time and the next time the voice data is sent by the terminal corresponding to each user;

The Second Setting module 610 is configured to set the allowed duration of the voice data sent the next time by the terminal corresponding to each user according to the length of waiting time determined by the Determining module 609, the preset range and the length of remaining time of the voice date sent the previous time by the terminal corresponding to each user;

Wherein, the length of remaining time of the voice date sent the previous time by the terminal corresponding to each user is the difference between the allowed duration of the voice data sent the previous time by the terminal corresponding to each user and the duration of the voice data sent the previous time by the terminal corresponding to each user.

Figure 13:
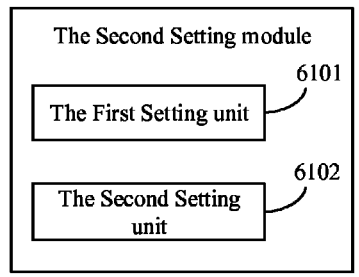
FIG. 13 is a structure schematic diagram of the Second Setting module provided by an example embodiment of the present disclosure.

Preferably as shown in FIG. 13, the Second Setting module 610 includes:

The First Setting unit 6101 is configured to set the allowed duration of the voice data sent the next time by the terminal corresponding to each user to equal to the sum of the length of remaining time of the voice date sent the previous time by the terminal corresponding to each user plus the length of waiting time when the length of waiting time is less than or equal to the difference between the preset range and the length of remaining time of the voice date sent the previous time by the terminal corresponding to each user;

The Second Setting unit 6102 is configured to set the allowed duration of the voice data sent the next time by the terminal corresponding to each user to equal to the preset range when the length of waiting time is greater than the difference between the preset range and the length of remaining time of the voice date sent the previous time by the terminal corresponding to each user.

Figure 14:
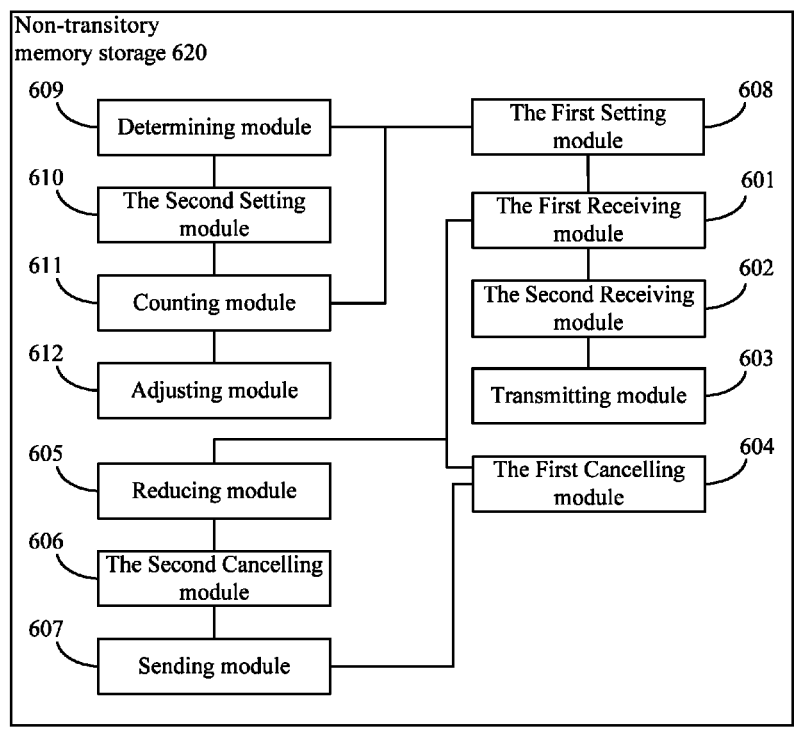
FIG. 14 is the structure schematic diagram of the eighth apparatus for controlling the voice data transmission provided by an example embodiment of the present disclosure.

Preferably as shown in FIG. 14, the apparatus also includes:

Counting module 611 is configured to count the quantity of the received voice data, of which the duration is greater than the preset allowed duration;

Adjusting module 612 is configured to adjust the allowed duration of the voice data set for the terminal corresponding to each user based on the quantity counted by Counting module 611.

In conclusion, in the apparatus for controlling the voice data transmission provided by the embodiment of the present disclosure, the voice data sent by the terminal corresponding to the second user is transmitted to the terminals corresponding to other users apart from the first user and the second user after received the blocking request carrying the ID of the second user sent by the terminal corresponding to the first user, which enables the terminal corresponding to the first user to block the voice data sent by the terminal corresponding to the second user immediately, so as to achieve the immediate and rapid voice data transmission control in a multi-user voice chat and optimize the voice chat environment effectively. Furthermore, the voice data sent by the terminal corresponding to the second user can be further controlled and voice chat environment can be further optimized after receiving the blocking request carrying the ID of the terminal corresponding to the second user, which is sent by the terminal corresponding to multiple first users.

Figure 15:
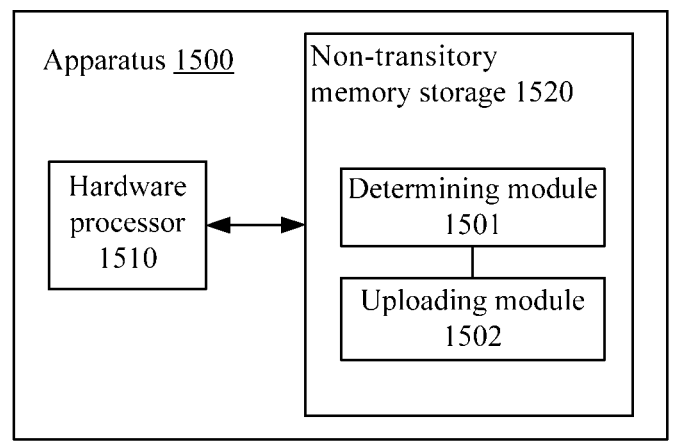
FIG. 15 is a structure schematic diagram of an apparatus for controlling the voice data transmission provided by an example embodiment of the present disclosure.

The embodiment of the present disclosure provides an apparatus 1500 for controlling the voice data transmission, the apparatus is configured to execute the method for controlling the voice data transmission in the above-mentioned embodiment 1 or 2. As shown in FIG. 15, the apparatus 1500 includes a hardware processor 1510 and a non-transitory storage medium 1520 accessible to the hardware processor 1510. The non-transitory storage medium 1520 is configured to store at least the following modules implemented by the hardware processor 1510: a determining module 1501 and an uploading module 1502.

The determining module 1501 is configured to determine the identification ID of the second user who is chosen to be blocked by users;

The uploading module 1502 is configured to upload the blocking request carried in the ID of the second user and determined by the Determining module 1501, to make the apparatus, which receives the blocking request, to control the voice data transmission on the terminal corresponding to the second user based on the ID of the second user.

Figure 16:
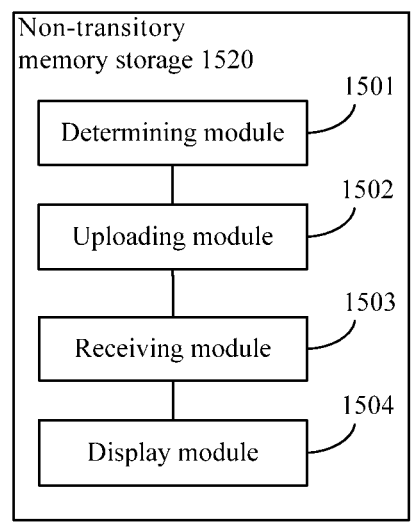
FIG. 16 is a structure schematic diagram of another apparatus for controlling the voice data transmission provided by an example embodiment of the present disclosure.

Preferably as shown in FIG. 16, the apparatus 1500 may also include:

Receiving module 1503 is configured to receive the prompt message for cancelling the transmission of the voice data sent by the terminal corresponding to the second user;

Display module 1504 is configured to display the prompt message received by the Receiving module 1503.

In conclusion, in the apparatus provided by the embodiment of the present disclosure, through uploading the blocking request carrying the ID of the second user, the apparatus which received the block information can transmit the voice data sent by the terminal corresponding to the second user to the terminals corresponding to other users apart from the user uploaded the block information and the second user after received the blocking request, which enables the terminal corresponding to the user uploaded the block information to block the voice data sent by the terminal corresponding to the second user immediately, so as to achieve the immediate and rapid voice data transmission control in a multi-user voice chat and optimize the voice chat environment effectively.

Figure 17:
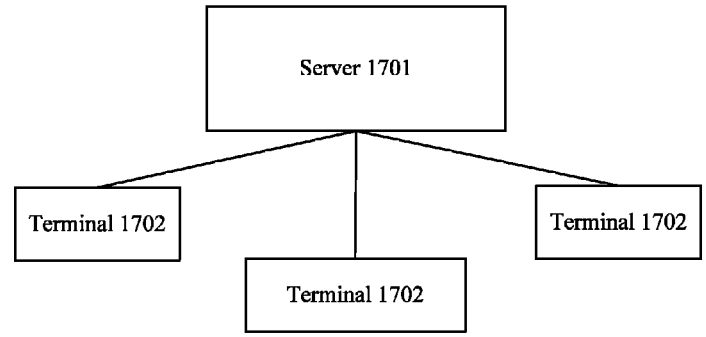
FIG. 17 is a structure schematic diagram of a system for controlling the voice data transmission provided by an example embodiment of the present disclosure.

The embodiment of the present disclosure provides a system for controlling the voice data transmission as shown in FIG. 17, the system includes at least a server 1701 and multiple terminals 1702.

Here, the server 1701 is configured with the above disclosed apparatus for controlling the voice data transmission in the above-mentioned apparatus 600. Each terminal 1702 is configured with the apparatus for controlling the voice data transmission in the above-mentioned apparatus 1500.

The system may execute the method in any above-mentioned method embodiment, for the detailed process, please see the description in the method embodiment.

In conclusion, in an example system provided by the above embodiments, the voice data sent by any terminal corresponding to the second user is transmitted to the terminals corresponding to other users apart from the first user and the second user after received the blocking request carrying the ID of the second user sent by a first terminal corresponding to the first user. The system enables the first terminal corresponding to the first user to block the voice data sent by any terminal corresponding to the second user immediately. so as to achieve the immediate and rapid voice data transmission control in a multi-user voice chat and optimize the voice chat environment effectively. Furthermore, the voice data sent by any terminal corresponding to the second user can be further controlled and voice chat environment can be further optimized after receiving the blocking request carrying the ID of the terminal corresponding to the second user, which is sent by the terminal corresponding to multiple first users.

The embodiment of the present disclosure provides a computer readable storage medium which may be the computer readable storage medium contained in the memory described in the above-mentioned embodiment; it may also be computer readable storage medium that exists alone and is not fitted into the terminal. The computer readable storage medium includes a non-transitory storage medium. The non-transitory storage medium stores one or more programs which are configured to execute a method for controlling the voice data transmission by one or more processors, the method includes:

Receiving the blocking request sent by the terminal corresponding to the first user among multiple users, wherein the blocking request carries the identification ID of the second user among multiple users;

Receiving the voice data sent by the terminal corresponding to the second user who is identified by the ID in the blocking request, and transmitting the voice data to terminals corresponding to other users among multiple users apart from the first user and the second user.

Assuming that the above is the first possible mode of execution, then based on the first possible mode of execution the second possible mode of execution is provided, in which after receiving the blocking request sent by the terminal corresponding to the first user among multiple users, the step also includes:

If the first preset quantity of the blocking request carrying the ID of the second user is received, then cancel the transmission of the voice data sent by the terminal corresponding to the second user to terminals corresponding to other users among multiple users apart from the second user.

Based on the first possible mode of execution the third possible mode of execution is provided, in which after receiving the blocking request sent by the terminal corresponding to the first user among multiple users, the step also includes:

If the second preset quantity of the blocking request carrying the ID of the second user is received, then reduce the allowed duration of the voice data sent by the terminal corresponding to the second user who is identified by the ID.

Based on the third possible mode of execution the fourth possible mode of execution is provided, in which after reducing the allowed duration of the voice data sent by the terminal corresponding to the second user who is identified by the ID, the step also includes:

If the times for reducing the allowed duration of the voice data sent by the terminal corresponding to the second user, who is identified by the ID, reaches the preset times, then cancel the transmission of the voice data sent by the terminal corresponding to the second user to terminals corresponding to other users among multiple users apart from the second user.

Based on any one from the first to the fourth possible mode of executions, the fifth possible mode of execution is provided, in which the method also includes:

Sending prompt message to the terminals corresponding to users, for whom the transmission of the voice data sent by the terminal corresponding to the second user is cancelled, among multiple users; so as to make the terminal, which receives the prompt message, display the prompt message.

Based on the first possible mode of execution, the sixth possible mode of execution is provided, in which before receiving the blocking request sent by the terminal corresponding to the first user among multiple users, the step also includes:

Setting the allowed duration of the voice data sent the first time by the terminal corresponding to each user as the preset range.

Based on the sixth possible mode of execution the seventh possible mode of execution is provided, in which after setting the allowed duration of the voice data sent the first time by the terminal corresponding to each user as the preset range, the step also includes:

Determining the length of waiting time between the previous time and the next time the voice data is sent by the terminal corresponding to each user;

Setting the allowed duration of the voice data sent the next time by the terminal corresponding to each user according to the length of waiting time, the preset range and the length of remaining time of the voice date sent the previous time by the terminal corresponding to each user;

Wherein, the length of remaining time of the voice date sent the previous time by the terminal corresponding to each user is the difference between the allowed duration of the voice data sent the previous time by the terminal corresponding to each user and the duration of the voice data sent the previous time by the terminal corresponding to each user.

Based on the seventh possible mode of execution the eighth possible mode of execution is provided, in which setting the allowed duration of the voice data sent the next time by the terminal corresponding to each user according to the length of waiting time, the preset range and the length of remaining time of the voice date sent the previous time by the terminal corresponding to each user, the step includes:

If the length of waiting time is less than or equal to the difference between the preset range and the length of remaining time of the voice date sent the previous time by the terminal corresponding to each user, then set the allowed duration of the voice data sent the next time by the terminal corresponding to each user to equal to the sum of the length of remaining time of the voice date sent the previous time by the terminal corresponding to each user plus the length of waiting time;

If the length of waiting time is greater than the difference between the preset range and the length of remaining time of the voice date sent the previous time by the terminal corresponding to each user, then set the allowed duration of the voice data sent the next time by the terminal corresponding to each user to equal to the preset range.

Based on any one from the sixth to the eighth possible mode of executions, the ninth possible mode of execution is provided, in which the method also includes:

Counting the quantity of the received voice data, of which the duration is greater than the preset allowed duration, and adjusting the allowed duration of the voice data set for the terminal corresponding to each user based on the repetition time.

In conclusion, in the computer readable media provided by the embodiment of the present disclosure, the voice data sent by the terminal corresponding to the second user is transmitted to the terminals corresponding to other users apart from the first user and the second user after received the blocking request carrying the ID of the second user sent by the terminal corresponding to the first user, which enables the terminal corresponding to the first user to block the voice data sent by the terminal corresponding to the second user immediately, so as to achieve the immediate and rapid voice data transmission control in a multi-user voice chat and optimize the voice chat environment effectively. Furthermore, the voice data sent by the terminal corresponding to the second user can be further controlled and voice chat environment can be further optimized after receiving the blocking request carrying the ID of the terminal corresponding to the second user, which is sent by the terminal corresponding to multiple first users.

Figure 18:
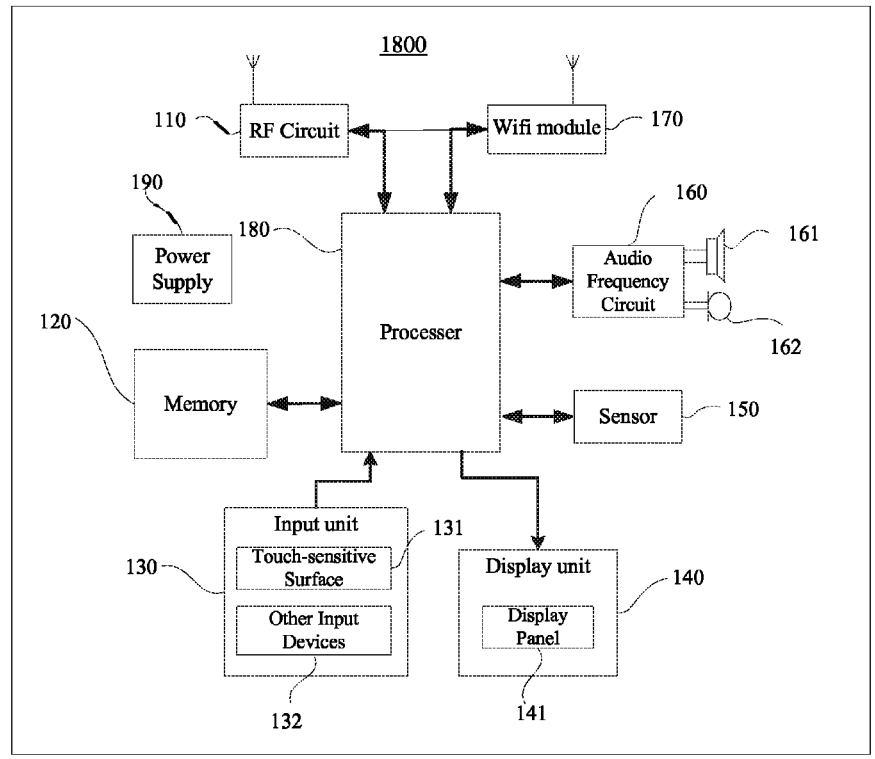
FIG. 18 is a structure schematic diagram of a terminal provided by an example embodiment of the present disclosure.

As shown in FIG. 18, the embodiment of the present disclosure provides a terminal which may be configured to execute the method for controlling the voice data transmission in the above-mentioned embodiment. Specifically:

Terminal 1800 can includes RF (Radio Frequency) Circuit 110, Memory 120 which includes one or more computer readable storage medium, Input unit 130, Display unit 140, Sensor 150, Audio Frequency Circuit 160, Wifi (wireless fidelity) module 170, Processor 180 which includes one or more processing cores and Power Supply 190 etc. A person skilled in the art know that the terminal is not limited to its structure shown in FIG. 18, it can includes more or less components than components in the Figure, or combines any component or adopts different component layout. Wherein:

RF Circuit 110 may be configured to receive and send signals during receiving and sending information or call, especially receive the downlink information from the base station and submit the information to one or more Processor 180 for processing; additionally, it can send the data related to the uplink to the base station. Generally, RF Circuit 110 include but not limited to antenna, at least one amplifier, a tuner, one or more oscillators, User Identity Module (SIM) card, transceiver, coupler, LNA (Low Noise Amplifier) and duplexer, etc. In addition, RF Circuit 110 can also communicate with other equipments via wireless communications and network. The wireless communication may use any communication standards or protocols, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service), etc.

Memory 120 for storing software programs and modules, Processor 180 runs the software programs and the modules stored in the Memory 120 to perform various function applications and data processing. Memory 120 may include programs storage area and data storage area, wherein programs storage area for storing the operating system and the application desired for function (e.g. sound playback function and image playback function, etc.), etc.; the data storage area for storing the created data (e.g. audio data and phone book, etc.) depending on use of Terminal 1800 etc. In addition, Memory 120 may include high-speed random access memories, and may also include non-volatile memory, e.g. at least one disk storage device, flash memory devices, or other volatile solid state memory devices. Accordingly, Memory 120 may also include a memory controller for providing access to Memory 120 by Processor 180 and Input unit 130.

Input unit 130 may be configured to receive the entered numbers or characters information, and generating keyboard, mouse, joystick and optical or trackball signal input related to user settings and functions control. Specially, Input unit 130 may also include Touch-sensitive Surface 131 and other Input Devices 132. Touch-sensitive Surface 131, also referred to touch display screen or touch pad, for collecting the touch operations on or near the screen or pad (e.g. the operations on or near the Touch-sensitive Surface 131 by suitable objects or accessories such as user fingers, stylus etc.), and driving the corresponding connecting devices based on the preset programs. Optionally, Touch-sensitive Surface 131 may include two parts: touch detection device and touch controller. Wherein the touch detection device for detecting the user's locations and the signal formed by touch operations, and transmitting the signal to the touch controller; the touch controller for receiving the touch information from the touch detection device and transforming the signal into contact coordinates which will be sent to Processor 180, and receiving and executing the commands from Processor 180. In addition, Touch-sensitive Surface 131 may be achieved by using several kinds of acoustic waves e.g. resistive, capacitive, infrared and surface acoustic waves. Input unit 131 may also include other Input Devices 132 except Touch-sensitive Surface 131. Specifically, other Input Devices 132 may include but not limited to one or more of physical keyboards, function keys (e.g. volume control buttons, switch keys, etc.), trackballs, mouses, joysticks, etc.

Display unit 140 may be configured to display the information entered by the user, the information supplied to the user or a variety of graphical user interfaces of Terminal 1800, graphics, texts, icons, videos and any combination of them can constitute these graphical user interfaces. Display unit 140 may include Display Panel 141 which can be configured optionally with LCD (Liquid Crystal Display), OLED (Organic Light-Emitting Diode) etc. Furthermore, Display Panel 141 can cover Touch-sensitive Surface 131, when Touch-sensitive Surface 131 detected the touch operations on or near itself, it will send the signal to Processor 180 to determine the type of the touch event, then Processor 180 will provide corresponding visual outputs on the Display Panel 141 depending on the type of the touch event. Although in FIG. 18, the Touch-sensitive Surface 131 and the Display Panel 141 implemented the input and input functions as two separate components, but in some embodiments, the Touch-sensitive Surface 131 and the Display Panel 141 can be integrated for achieving the input and output function.

Terminal 1800 may also include at least one Sensor 150, e.g. optical sensors, motion sensors and other sensors. Specifically, optical sensor may include an ambient light sensor and a proximity sensor, wherein, the ambient light sensor can adjust the brightness of the Display Panel 141 according to the ambient light and darkness, a proximity sensor can turn off Display Panel 141 and/or backlight when Terminal 1800 is moved to the ear. Gravity acceleration sensor, as one of motion sensors, for detecting the magnitude of acceleration on all directions (generally triaxial), detecting the magnitude and direction of gravity when it is stationary, and recognizing applications of terminal posture (e.g. switch the screen anyway, related games and magnetometer posture calibration) and vibration recognition related functions (e.g. pedometers and percussions), etc.; the gyroscope, barometer, hygrometer, thermometer, infrared sensors and other sensors may also be supplied on Terminal 1800, which are need not be repeated here.

Audio Circuit 160, Speaker 161 and Microphone 162 may provide audio interfaces between the user and Terminal 1800. Audio Circuit 160 may convert the received audio data into an electrical signal to be transmitted to the Speaker 161, in which the electrical signal is to be converted into a sound signal output; On the other hand, the collected sound signal will be converted into an electrical signal by Microphone 162, Audio Circuit 160 receives the electrical signal and converts it into audio data which will be exported to Processor 180 for processing and transmitted to another terminal via RF Circuit 110 or exported to Memory 120 for further processing. Audio Circuit 160 may also include earplug jack to provide communication between the peripheral headset and Terminal 1800.

WiFi is a technology of short range wireless transmission, Terminal 1800 can help users to receive and send email, browse the web and access streaming media etc. via the WiFi module 170; it provides users with wireless broadband Internet access. Although the FIG. 18 shows WiFi module 170, but it can be understood that the module is not a must-have for Terminal 1800, and can be omitted within the range of not changing nature of the disclosure as needed.

Processor 180 is the control center of Terminal 1800, for using a variety of interfaces and lines to connect various parts throughout the terminal, and executing various functions of Terminal 1800 and processing data by running or executing software programs and/or modules stored in Memory 120 and calling the data stored in Memory 120, to achieve the overall control of the terminal. Optionally, Processor 180 may include one or more processing cores; Preferably, Processor 180 may be integrated with an application processor and a modem processor, wherein the application processor is mainly configured to process operating system, user interface and applications etc., the modem processor is configured to process wireless communications. It can be understood that the modem processor may not be integrated into Processor 180.

Terminal 1800 may also include Power Supply 190 (e.g. a battery) which powers the various components, preferably, the power supply can achieve logic connection with Processor 180 via the power supply management system, and thus achieving functions such as charging, discharging and power consumption management via the power supply management system. Power Supply 190 may also include one or more any component such as DC or AC power supply, recharging system, power supply failure detection circuit, power supply converter or inverter and power supply status indicator etc.

Although not shown in Figure, Terminal 1800 may also include camera, Bluetooth module etc., which are need not be repeated here. Specifically in this embodiment, the display unit of the terminal is a touch display screen, the terminal also includes memories and one or more programs, wherein the one or more programs are stored in the memories and will be executed by one or more processors after configured, in which the commands for following operations are included:

The first terminal determines the identification ID of the second user who is chosen to be blocked by users;

Uploading the blocking request carried in the ID of the second user, to make the apparatus, which receives the blocking request, to control the voice data transmission on the terminal corresponding to the second user based on the ID of the second user.

Assuming that the above is the first possible mode of execution, and then based on the first possible mode of execution the second possible mode of execution is provided, in which and in the memory of the terminal, the commands for following operations are also included:

Receiving the prompt message for cancelling the transmission of the voice data sent by the terminal corresponding to the second user, and displaying the prompt message.

In conclusion, in the terminal provided by the embodiment of the present disclosure, through uploading the blocking request carrying the ID of the second user, the apparatus which received the block information can transmit the voice data sent by the terminal corresponding to the second user to the terminals corresponding to other users apart from the user uploaded the block information and the second user after received the blocking request, which enables the terminal corresponding to the user uploaded the block information to block the voice data sent by the terminal corresponding to the second user immediately, so as to achieve the immediate and rapid voice data transmission control in a multi-user voice chat and optimize the voice chat environment effectively.

The embodiment of the present disclosure provides a computer readable storage medium which may be the computer readable storage medium contained in the memory described in the above-mentioned embodiment; it may also be computer readable storage medium that exists alone and is not fitted into the terminal. The computer readable storage medium stores one or more programs which are configured to execute a method for controlling the voice data transmission by one or more processors, the method includes:

The first terminal determines the identification ID of the second user who is chosen to be blocked by users;

Uploading the blocking request carried in the ID of the second user, to make the apparatus, which receives the blocking request, to control the voice data transmission on the terminal corresponding to the second user based on the ID of the second user.

Assuming that the above is the first possible mode of execution, then based on the first possible mode of execution the second possible mode of execution is provided, in which the blocking request carried in the ID of the second user is uploaded, the step also includes:

Receiving the prompt message for cancelling the transmission of the voice data sent by the terminal corresponding to the second user, and displaying the prompt message.

In conclusion, in the computer readable media provided by the embodiment of the present disclosure, through uploading the blocking request carrying the ID of the second user, the apparatus which received the block information can transmit the voice data sent by the terminal corresponding to the second user to the terminals corresponding to other users apart from the user uploaded the block information and the second user after received the blocking request, which enables the terminal corresponding to the user uploaded the block information to block the voice data sent by the terminal corresponding to the second user immediately, so as to achieve the immediate and rapid voice data transmission control in a multi-user voice chat and optimize the voice chat environment effectively.

The embodiment of the present disclosure provides a graphical user interface which is used on the terminal, the terminal includes a touch display screen, memories and one or more processors that are used to execute one or more programs; the graphical user interface includes:

Determining the identification ID of the second user who is chosen to be blocked by users;

Uploading the blocking request carried in the ID of the second user, to make the apparatus, which receives the blocking request, to control the voice data transmission on the terminal corresponding to the second user based on the ID of the second user.

In conclusion, in the terminal provided by the embodiment of the present disclosure, through uploading the blocking request carrying the ID of the second user, the apparatus which received the block information can transmit the voice data sent by the terminal corresponding to the second user to the terminals corresponding to other users apart from the user uploaded the block information and the second user after received the blocking request, which enables the terminal corresponding to the user uploaded the block information to block the voice data sent by the terminal corresponding to the second user immediately, so as to achieve the immediate and rapid voice data transmission control in a multi-user voice chat and optimize the voice chat environment effectively.

It is important to note that the apparatus and system for controlling the voice data transmission provided by the above embodiments only gives examples for the division of the above respective function module, while in the actual application, the above functions can be assigned to different module to complete as required, i.e. dividing the internal structure of the apparatus and system for controlling the voice data transmission into different function modules to complete the all or part of functions described above. Additionally, the apparatus and system for controlling the voice data transmission provided by the above-mentioned embodiments and the method embodiment for controlling the voice data transmission come from the same conception. For the details of the specific realization process, please see the method embodiment, which need not be repeated here.

The serial number for the embodiment of the present disclosure is used for description only, it doesn't mean the merits of the embodiment.

A common person skilled in the art can understand that the realization of all or part of procedures can be achieved via hardware or related hardware instructed by programs which can store in one computer readable storage medium that may be a read-only memory, a disk or a CD-ROM etc.

Disclosed above are only example embodiments of the present disclosure and these example embodiments are not intended to be limiting the scope of the present disclosure, hence any variations, modifications or replacements made without departing from the spirit of the present disclosure shall fall within the protective scope of the present disclosure.

What is claimed is:
1. A method for controlling voice data transmission, comprising:
receiving, by a server device having a processor, a blocking request sent by a first terminal corresponding to a first user in a user group comprising multiple users, wherein the blocking request carries an identification (ID) of a second user in the user group;

receiving, by the server device, the voice data sent by a second terminal corresponding to the second user who is identified by the ID in the blocking request, and transmitting the voice data to terminals corresponding to other users in the user group apart from the first user and the second user;

setting, by the server device, an allowed duration of the voice data to each user according to a preset range so that each user has a same allowed duration when sending voice data at a first time;

determining, by the server, a waiting time duration since a previous time when the voice data was sent by the terminal corresponding to each user; and setting the allowed duration of the voice data sent the next time by the terminal corresponding to each user according to the waiting time duration, the preset range, and a length of remaining time of the voice date sent the previous time by the terminal corresponding to each user; and wherein the length of remaining time of the voice date sent the previous time by the terminal corresponding to each user is a difference between the allowed duration of the voice data sent the previous time by the terminal corresponding to each user and the duration of the voice data sent the previous time by the terminal corresponding to each user.

2. The method of claim 1, wherein after receiving the blocking request, the method further comprises:

when a first preset quantity of the blocking request carrying the ID of the second user is received, blocking, by the server device, the transmission of the voice data from the second user to all other terminals corresponding to other users in the user group.

3. The method of claim 1, wherein after receiving the blocking request, the method further comprises:

when a second preset quantity of the blocking request carrying the ID of the second user is received, reducing, by the server device, an allowed duration of the voice data sent by the second user identified by the ID.

4. The method of claim 3, wherein after reducing the allowed duration of the voice data, the method further comprises:

determining, by the server device, a repetition times of reducing the allowed duration of the voice data during a preset time duration; and if the repetition times corresponding to the second user reaches a preset time, then blocking, by the server device, the transmission of the voice data from the second user to all other terminals corresponding to other users in the user group.

5. The method of claim 1, further comprising:

sending a prompt message to a target terminal, for whom the transmission of the voice data corresponding to the second user is blocked, so that the target terminal displays the prompt message.

6. The method of claim 1, wherein setting the allowed duration of the voice data comprises:

when the length of a waiting time is less than or equal to the difference between the preset range and the length of remaining time of the voice date sent the previous time by the terminal corresponding to each user, setting the allowed duration of the voice data sent the next time by the terminal corresponding to each user to a sum of the length of remaining time of the voice date sent the previous time by the terminal corresponding to each user plus the length of waiting time; and when the length of the waiting time is greater than the difference between the preset range and the length of remaining time of the voice date sent the previous time by the terminal corresponding to each user, setting the allowed duration of the voice data sent the next time by the terminal corresponding to each user to the preset range.

7. The method of claim 1, further comprising:

counting a repetition time of the received voice data that have a duration greater than the allowed duration; and adjusting the allowed duration of the voice data set by the terminal corresponding to each user based on the repetition time.

8. A server for controlling voice data transmission, comprising a hardware processor and a non-transitory storage medium having instructions stored therein, wherein when the instructions are executed by the processor, the server:

receives a blocking request sent by a first terminal corresponding to a first user of a user group comprising multiple users, wherein the blocking request carries an identification (ID) of a second user of the user group;

receives voice data sent by a second terminal corresponding to the second user identified by the ID in the received blocking request;

transmits the voice data to terminals corresponding to other users in the user group apart from the first user and the second user;

sets an allowed duration of the voice data to each user according to a preset range so that each user has a same allowed duration when sending voice data at a first time;

determines a length of waiting time between the previous time and the next time the voice data is sent by the terminal corresponding to each user; and sets the allowed duration of the voice data sent the next time by the terminal corresponding to each user according to the length of determined waiting time, the preset range and the length of remaining time of the voice date sent the previous time by the terminal corresponding to each user; and wherein the length of remaining time of the voice date sent the previous time by the terminal corresponding to each user is a difference between the allowed duration of the voice data sent the previous time by the terminal corresponding to each user and the duration of the voice data sent the previous time by the terminal corresponding to each user.

9. The server of claim 8, wherein when the instructions are executed by the processor, the server:

cancels the transmission of the voice data sent by any terminal corresponding to the second user to terminals corresponding to other users among multiple users apart from the second user when a first preset quantity of the blocking request carrying the ID of the second user is received.

10. The server of claim 8, wherein when the instructions are executed by the processor, the server:

reduces an allowed duration of the voice data sent by any terminal corresponding to the second user who is identified by the ID when a second preset quantity of the blocking request carrying the ID of the second user is received.

11. The server of claim 10, wherein when the instructions are executed by the processor, the server:

cancels the transmission of the voice data sent by any terminal corresponding to the second user to terminals corresponding to other users among multiple users apart from the second user when the times for reducing the allowed duration of the voice data sent by the terminal corresponding to the second user, who is identified by the ID, reaches the preset times.

12. The server of claim 8, wherein when the instructions are executed by the processor, the server:
sends a prompt message to the terminals corresponding to users, for whom the transmission of the voice data sent by the terminal corresponding to the second user is cancelled, among multiple users.

13. The server of claim 8, wherein when the instructions are executed by the processor, the server:
sets the allowed duration of the voice data sent the next time by the terminal corresponding to each user to equal to a sum of the length of remaining time of the voice date sent the previous time by the terminal corresponding to each user plus the length of waiting time when the length of waiting time is less than or equal to the difference between the preset range and the length of remaining time of the voice date sent the previous time by the terminal corresponding to each user; and
sets the allowed duration of the voice data sent the next time by the terminal corresponding to each user to equal to the preset range when the length of waiting time is greater than the difference between the preset range and the length of remaining time of the voice date sent the previous time by the terminal corresponding to each user.

14. The server of claim 13, wherein when the instructions are executed by the processor, the server:
counts a quantity of the received voice data that has a duration greater than the allowed duration; and
adjusts the allowed duration of the voice data set by the terminal corresponding to each user based on a repetition time.

* * * * *